US006971484B2

(12) United States Patent
Sekiguchi

(10) Patent No.: US 6,971,484 B2
(45) Date of Patent: Dec. 6, 2005

(54) ELECTRIC DISC BRAKE

(75) Inventor: Kazuhiro Sekiguchi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/700,662

(22) Filed: Nov. 5, 2003

(65) Prior Publication Data

US 2004/0112690 A1  Jun. 17, 2004

(30) Foreign Application Priority Data

Nov. 18, 2002 (JP) ............ P. 2002-333008

(51) Int. Cl.[7] ............................................. F16D 55/08
(52) U.S. Cl. ................................................. 188/72.7
(58) Field of Search .............................. 188/72.7, 72.8

(56) References Cited

U.S. PATENT DOCUMENTS 4,909,359 A * 3/1990 Fujinami et al. ............ 188/72.7
6,279,691 B1 * 8/2001 Takahashi et al. .......... 188/72.8
6,374,958 B1 * 4/2002 Usui et al. .................. 188/72.7
2003/0042084 A1 * 3/2003 Kawase et al. ............. 188/72.1
2004/0104087 A1 * 6/2004 Takahashi ................... 188/156

FOREIGN PATENT DOCUMENTS

JP    11-132266    5/1999
JP    2000-346109  12/2000

* cited by examiner

Primary Examiner—Thomas Williams
(74) Attorney, Agent, or Firm—Morgan, Lewis & Bockius LLP

(57) ABSTRACT

A ball ramp mechanism constituting a force transmission converting mechanism is inserted into a cylinder of a caliper body and a relative rotation angle thereof is restricted to a predetermined range. Further, by successively assembling a piston head, a ramp plate and a ball and a screw shaft member constituting the ball ramp mechanism, a coil spring and an end plate in this order and by catching the end plate by a slit of a piston case in a state of flexing the coil spring, respective parts are elastically connected and assembled by the spring.

3 Claims, 4 Drawing Sheets

ELECTRIC DISC BRAKE

BACKGROUND OF THE INVENTION

The present invention relates to an electric disc brake mounted to an automobile, an industrial machine or the like and constituting a drive source thereof by a motor, particularly, relates to an electric disc brake integrally assembled with a ball ramp mechanism as a rotation/linear movement conversion mechanism at inside of a piston case.

In a conventional art, there is known an electric disc brake apparatus generating braking force by an output of an electric motor without using a brake fluid as a brake apparatus of a vehicle of, for example, an automobile, an industrial machine or the like. The electric disc brake apparatus is constituted by a drive member driven by an electric motor, a pressing member for pressing a pad to a rotor by receiving exerting force from the drive member between the drive member and the pad, a rotation/linear movement conversion mechanism (ball ramp mechanism) for connecting the drive member and the pressing member and the like. These generate braking force by converting rotational movement of the electric motor into an extracting and retracting movement of a piston by a ball screw mechanism and pressing the pad to the rotor by the piston (See JP-A-11-132266 <Japanese Patent Application Publication Number: Hei11-132266> and JP-A-2000-346109 <Japanese Patent Application Publication Number: 2000-346109>).

The electric disc brake apparatus described in JP-A-11-132266 is an example of elastically coupling a male screw member and the pressing member by spherical contact at a portion of the apparatus for pressing the pad, and in the case of the example, there is a possibility of detaching the male screw member from the pressing member when force is exerted from outside.

Further, the electric disc brake apparatus described in JP-A-2000-346109 is an example of using the ball ramp mechanism, and in the case of the example, means for restricting rotation of the ball to a predetermined range is not provided and therefore, there is conceivable a drawback that a ball rides over a ball groove by excessively rotating the electric motor.

In order to prevent the ball from riding over from a ramp face by excessively rotating the motor, as shown by FIG. 5, the ramp groove needs to set deeply and therefore, there is an inconvenience that an operational rotating angle of the ramp cannot be set to be large.

Further, when the operational rotating angle is intended to set to be large as shown by FIG. 6 in order to resolve the problem shown in FIG. 5, an operational effective diameter of the ball ramp needs to be large, as a result, a diameter of the ball ramp mechanism becomes large to thereby bring about a drawback of large-sized formation of the ball ramp mechanism and a deterioration in efficiency.

Further, the above-described electric disc brake apparatus has shortcomings that the function is complicated, further, the assembling structure is also complicated and the operational efficiency is poor.

SUMMARY OF THE INVENTION

Therefore, it is an object of the invention to resolve the above-described problem by providing an electric disc brake provided with an excessive rotation preventing mechanism in which a ramp plate of a ball ramp mechanism restricts rotation to a predetermined range, preventing the drawback that the ball rides over a ball groove by drive force of an electric motor by the excessive rotation preventing mechanism and capable of preventing a piston head from detaching from the ball ramp mechanism.

Further, it is an object thereof to promote a function of piston assembly in an electric disc brake and facilitate assembling.

Therefore, technical resolving means adopted by the invention is; an electric disc brake comprising a piston for pressing a pad to a rotor via a ball ramp mechanism by driving an electric motor, wherein the ball ramp mechanism includes: a spherical member; two squeezing members, rotatable relatively, each having a circular-arc-shaped groove with a gradually changed depth, squeezing the spherical member in the circular-arc-shaped grooves, and an excess rotation preventing mechanism for restricting a relative rotation between the squeezing members to a predetermined range of rotation angle.

Further, the technical resolving means is the electric disc brake wherein the excess rotation preventing mechanism comprises a first projected portion formed at one of the squeezing members and a second projected portion at other member thereof, and the first projected portion and the second projected portion are able to butt each other.

Further, the technical resolving means is the electric disc brake wherein the first projected portion is formed at a central opening of the one member, and the second projected portion is inserted into a central opening of the other member.

Further, the technical resolving means is the electric disc brake wherein the piston comprises a piston head and a cylindrical member, and the piston head is prevented from being detached from the ball ramp mechanism by a detachment preventing mechanism.

Further, the technical resolving means is the electric disc brake wherein the detachment preventing mechanism is integrally assembled into the cylindrical member in an order of the piston head engaged with the cylindrical member arranged slidably in an axial direction of a rotor in a cylinder formed at a caliper of the electric disc brake while being restricted to move to a side of the rotor, the ball ramp mechanism, a coil spring and a plate.

Further, the technical resolving means is the electric disc brake wherein the piston head is made inclinable to the ball ramp mechanism.

Figure 1:
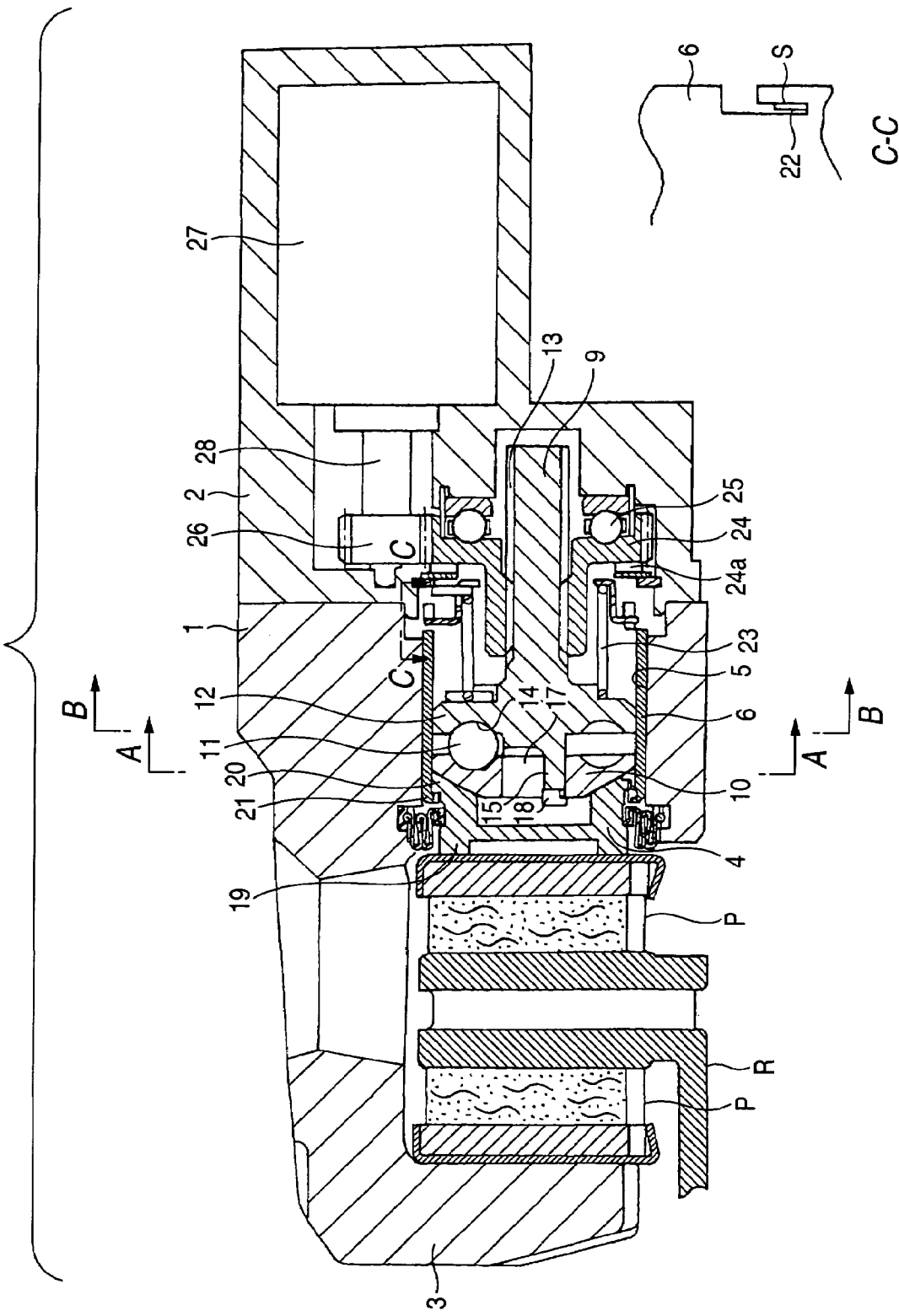
FIG. 1 is a vertical sectional view showing an electric disc brake apparatus according to the invention.

Note that in the drawings, reference numeral 1 denotes a caliper body, 2 a housing, 3 a claw portion, 4 a piston head, 5 a cylinder, 6 a piston case (cylindrical member), 7 a projected portion, 8 a recessed portion, 9 a screw shaft member, 10 a ramp plate (squeezing member), 11 a ball (spherical member), 12 a disc member (squeezing member), 13 a screw portion, 14 a ball groove, 15 a projected member, 16 a ball groove, 17 a through hole, 18 a key, 19 a cylindrical portion, 20 a flange portion, 21 an engaging portion, 22 a plate, 23 a coil spring, 24 a nut, 25 a thrust bearing, 26 a pinion gear, 27 an electric motor, 28 a rotating shaft, a a deepest portion, b a shallowest portion, h a height difference, R a rotor, P a pad

DESCRIPTION OF THE PREFERRED EMBODIMENT

Figure 2:
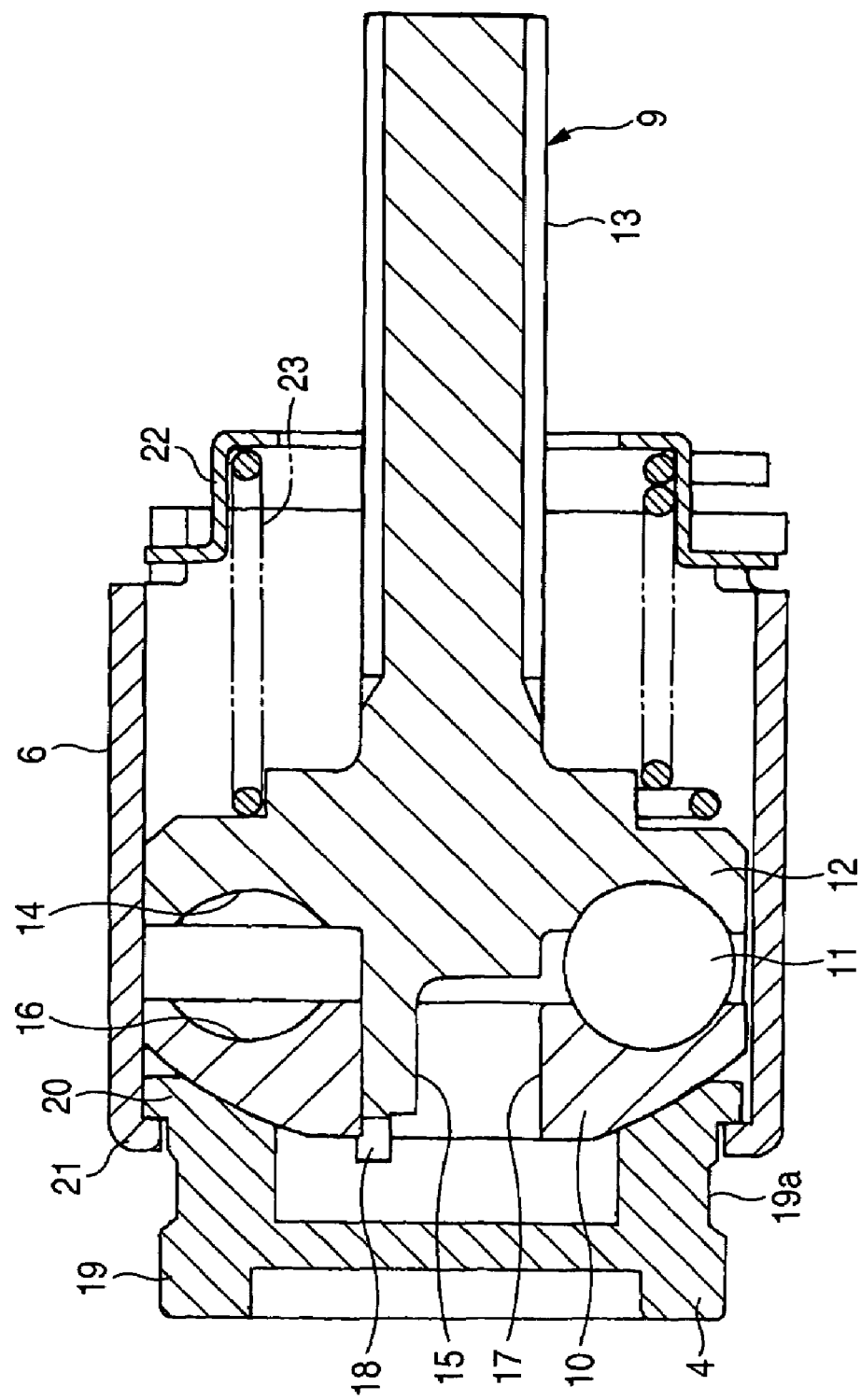
FIG. 2 is a sectional view enlarging an integrated ball ramp mechanism.
Figure 3:
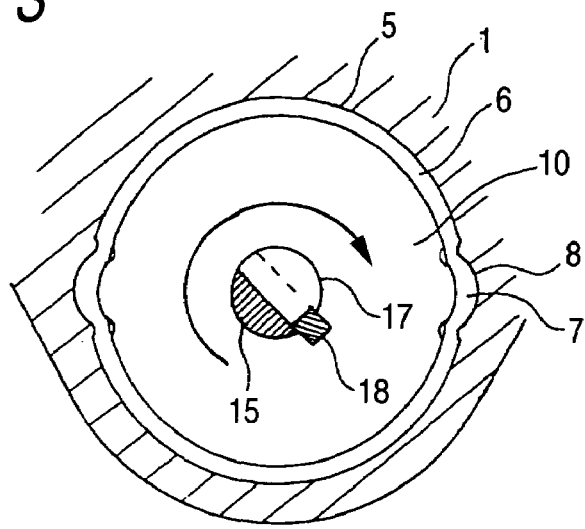
FIG. 3 is a sectional view taken along a line A—A of FIG. 1.
Figure 4:
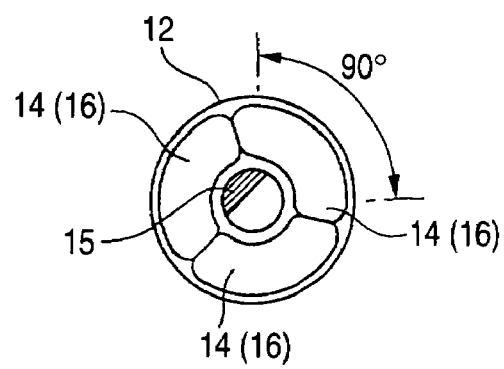
FIG. 4A is a sectional view taken along a line B—B of FIG. 1
FIG. 4B is an explanatory view showing an allowable range of rotation of a ball.
Figure 4:
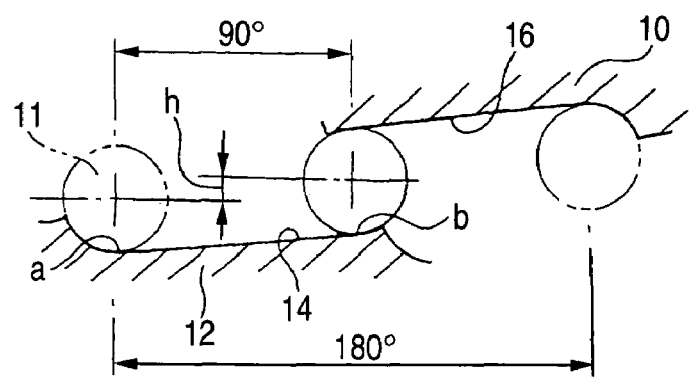
Figure 5:
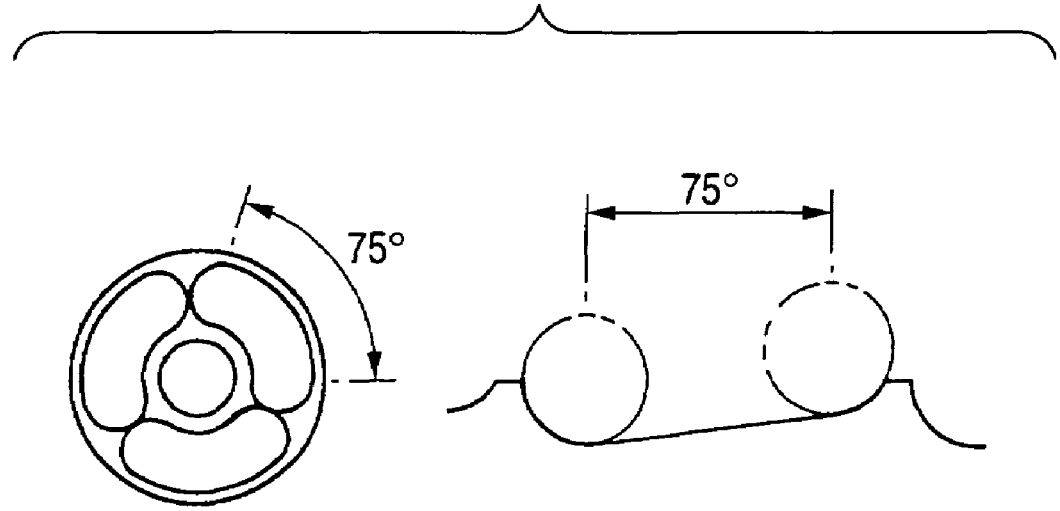
FIG. 5 is an explanatory view showing an allowable range of rotation of a ball of a conventional apparatus and a view in correspondence with FIG. 4B.
Figure 6:
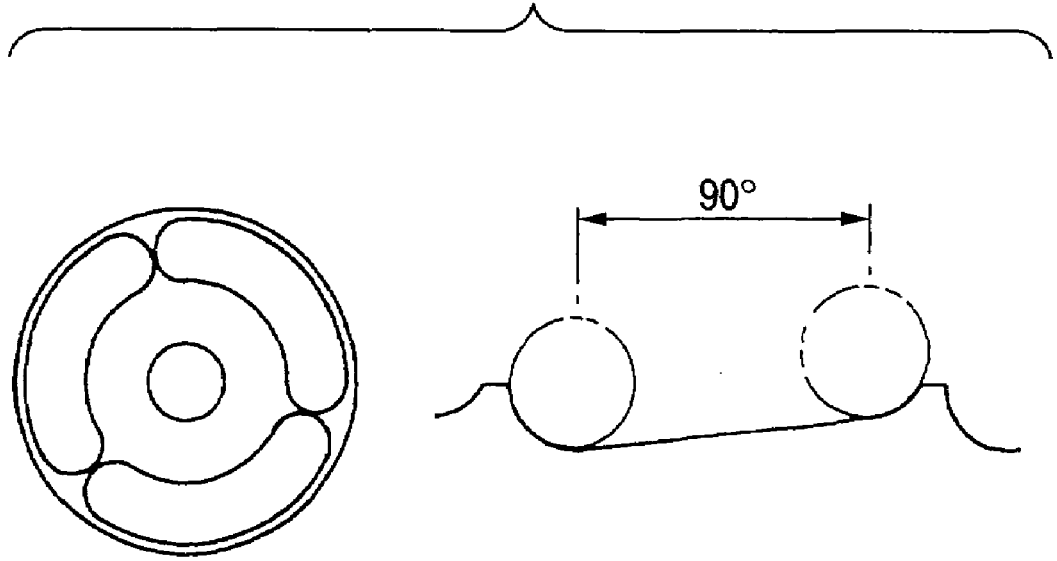
FIG. 6 is an explanatory view showing an allowable range of rotation of a ball of other conventional apparatus and is a view in correspondence with FIG. 4B.

An embodiment of the invention will be explained in reference to FIG. 1 through FIG. 4B as follows. FIG. 1 is a vertical sectional view showing an electric disc brake according to the invention, FIG. 2 is a sectional view enlarging an integrated ball ramp mechanism, FIG. 3 is a sectional view taken along a line A—A of FIG. 1, FIG. 4A is a sectional view taken along a line B—B of FIG. 1 and FIG. 4B is an explanatory view showing a rotational allowable range of the ball ramp mechanism according to the invention.

In FIG. 1, a caliper of an electric disc brake is provided with a caliper body 1 and a housing 2 mounted to the caliper body 1 and the caliper body 1 and housing 2 include a ball ramp mechanism, an electric motor and the like constituting a force transmission converting mechanism. A front end portion of the caliper body 1 is provided with a claw portion 3 extended to an opposed side by riding over a rotor R which is a braked member. There is constructed a constitution in which a pad P as a friction member opposed to the rotor R which is a braked member is provided between the claw portion 3 and a piston head 4, mentioned later, and the braking force can be operated by pressing the rotor R as the braked member by moving the pad P in an axial direction by the piston head 4 at an end portion of a piston. A piston case 6 forming a slidably moving portion of the piston is arranged at inside of a cylinder 5 formed at the caliper body 1 and as shown by FIG. 3, the piston case 6 is provided with a projected portion 7 at a pertinent portion at a surrounding thereof and the projected portion 7 is fitted to a recessed portion 8 formed at an inner face of the caliper body 1 in the axial direction. Thereby, the piston case 6 is constituted unrotatably relative to the caliper body and slidably in the axial direction of the rotor. Further, the piston case 6 is inserted with the ball ramp mechanism constituting the force transmission converting mechanism. The ball ramp mechanism is constituted by a screw shaft member 9, a ramp plate 10 provided to be opposed to a disc member formed at an end face of the screw shaft member 9 and a spherical body (ball) 11 interposed therebetween.

Next, a constitution related to the screw shaft member 9 and the ramp plate 10 will be explained in reference to FIG. 1, FIG. 2, FIG. 4A and FIG. 4B.

The screw shaft member 9 comprises a disc member 12 constituting a squeezing member on one side and a screw portion 13 extended from a center of the disc member 12, three grooves (ball grooves) 14 extended in a shape of a circular arc are formed in a circumferential direction of the disc member 12 and a projected member 15 projected to the left of FIG. 1 is formed at a position more of less shifted from the center of the disc member 12.

Three grooves (ball grooves) 16 extended in a shape of a circular arc are provided along a circumferential direction at an opposed face of the ramp plate 10 constituting a squeezing member on other side opposed to the disc member 12, further, a through hole is provided at the central portion thereof, further, a key 18 is embedded to an inner wall of the through hole 17.

The three ball grooves 14 of the disc member 12 and three ball grooves 16 of the ramp plate 10 are arranged at equal intervals by being respectively extended in an equal range of a center angle, as shown by FIG. 4B, the respective ball grooves 14 and 16 are constituted such that each of the ball grooves 14 and 16 is inclined by a height difference h from a deepest portion a at one end portion to a shallowest portion b at other end portion and the balls 11 can be moved in the respective grooves relative to the respective squeezing members in a range of a rotational angle of 90° as shown by FIG. 4B (therefore, according to the example, the disc member 12 and the ramp plate 10 can be rotated relatively by 180°). Further, each of the ball grooves 14 of the disc member 12 of the screw shaft member 9 and each of the ball grooves 16 of the ramp plate 10 are arranged such that the deepest portions a are respectively opposed to each other and each of the balls 11 is mounted at each interval between the deepest portions a at original positions thereof. Thereby, when the screw shaft member 9 is rotated relative to the ramp plate 10, the ball 11 is rolled to a side of the shallowest portion b at insides of the ball grooves 14 and 16, the ramp plate 10 is moved along the axial direction in a direction of separating from the screw shaft member 9 in accordance with the rotation angle to thereby press the piston head 4. Further, at this occasion, since a ball ramp excessive rotation preventing mechanism, mentioned later, is provided at inside of the ball ramp mechanism, the operational rotating angle of the ball ramp can be set to an angle at which the respective ramp grooves overlap, that is, the ball can be prevented from riding over by excessive rotation of the disc member 12 relative to the ramp plate 10 and therefore, the operational effective diameter of the ball ramp mechanism can be reduced and small-sized efficiency of the ball ramp mechanism can be realized.

Further, as described above, the disc member 12 of the screw shaft member 9 is provided with the projected member 15 as a second projected portion and the projected member 15 is inserted into the through hole 17 of the ramp plate 10. Further, the projected member 15 of the screw shaft member 9 can be rotated until the projected member 15 is brought into contact with the key 18 as the first projected portion (angle 180°) and when the projected member 15 is going to be rotated further, rotation of the projected member 15 is restricted by the key 18 to thereby constitute a ball ramp excessive rotation preventing mechanism (FIG. 3).

That is, rotation of the screw shaft portion 9 is restricted by butting the projected member 15 (second projected portion) of the screw shaft member 9 and the key 18 (first projected portion) of the ramp plate 10 and the screw shaft member 9 cannot be rotated further.

Next, an explanation will be given of a constitution related to the piston head 4 and the ramp 10 in reference to FIG. 1 and FIG. 2.

The surface of the ramp plate 10 is formed in a spherical shape, a spherical face thereof is coupled with a spherical face of the piston head 4 and the piston head 4 is attached to the ball ramp mechanism inclinably in the axial direction. Specifically, the piston head 4 is made movable relative to the ramp plate 10 by a small angle, uneven wear of the pad P by deformation of the caliper body can be prevented and an excessive load can be prevented from being operated on portions of the balls.

The piston head 4 includes a cylindrical portion 19 and a flange portion 20 formed at a front end of the cylindrical portion 19. Further, one end face of the cylindrical portion 19 opposed to the ramp plate 10 of the piston head 4 is formed in a spherical shape to be coupled to the ramp plate 10 as described above. Further, an outer peripheral face of the cylindrical portion 19 is formed in a recessed shape to constitute a seat for mounting a dust seal. Further, the flange portion 20 at the front end of the cylindrical portion 19 is engaged with an engaging portion 21 formed at a front end of the piston case 6 to thereby restrict movement of the piston head 4 to the left of FIG. 1. Further, a coil spring 23 is interposed between the disc member 12 and an end plate (plate) 22.

Therefore, as shown by FIG. 2, the screw shaft member 9 is normally urged to the left by the coil spring 23, by the urging force, the disc member 12, the ball 11, the ramp plate 10 and the piston head 4 are brought into an integrally coupled state and a piston head detachment preventing mechanism is constituted thereby.

Next, an explanation will be given of the constitution of slidably moving the screw shaft member 9 in the axial direction in reference to FIG. 1.

A nut 24 is screwed to the screw portion 13 extended from the center of the disc member 12 of the screw shaft member 9 and the nut 24 is rotatbly supported axially by a thrust bearing 25 and is made unmovable in the axial direction by a member 24a. Further, the nut 24 is brought in mesh with a pinion gear 26 and the pinion gear 26 is fixed to a rotating shaft 28 of an electric motor 27 provided at inside of the housing 2 to thereby constitute a rotation drive mechanism rotated by a desired torque.

Next, an explanation will be given on assembling.

As shown by FIG. 2, the piston assembly is inserted from the right side until the flange portion 20 of the piston head 4 is brought into contact with the engaging portion 21 of the piston case 6. Thereafter, the ramp plate 10, the ball 11, the screw shaft member 9 and the coil spring 23 are successively assembled and the end plate 22 is fitted to a slit S formed at the piston case 6 in a circumferential direction from the axial direction against the urging force of the coil spring 23 to thereby carry out assembling. By catching the end plate 22 by the slit S formed at the piston case 6 in a state of flexing the coil spring 23, the respective parts are elastically connected by the spring to assemble integrally. Further, by operation of the coil spring, the squeezing members are forced to squeeze and rotate in directions approaching each other and by the recovery force of the coil spring, the end plate 22 restricting positions of these at inside of the piston is rotated in the engaging direction to ensure engagement with the slit S.

Since assembled as described above, even when the piston head 4 is pulled from the left side of FIG. 1, the piston head 4 is not detached because the piston head 4 is restricted by the engaging portion 21 of the piston case 6.

An explanation will be given of operation of the electric disc brake constituted by being assembled as described above.

In braking, when the electric motor 17 is rotated, the rotation successively rotates the rotating shaft 21, the pinion gear 26 and the nut 24. Since the nut 24 is made and unmovable in the axial direction, the screw portion 13 of the screw shaft member 9 brought in mesh with the nut 24 is moved to the left in the axial direction of FIG. 1 from the relationship between the bolt and the nut. The screw shaft member 9 is rotated along with the nut when a friction force of the portion thereof in mesh with the nut becomes higher than a predetermined amount. The rotation of the screw shaft member 9 rolls the balls 11 of the ball ramp mechanism respectively along the ball grooves 13 and 14. Further, the ramp plate 10 is moved in an opposed direction of the axial direction (direction separating from the screw shaft member 9) and the pad is pressed to the rotor to thereby generate braking force.

Further, in braking operation, the ball 11 does not ride over the ball groove 16 because the ball ramp mechanism is restricted from rotating more than the predetermined rotational angle by restricting rotation of the screw shaft member 9 by the key 18 by making a rotatable angle by the positional relationship between the projected member 15 of the screw shaft member 9 and the key 18 of the ramp 10 and the rotational angle of the ramp plate determined by the ball groove of the ramp plate 10 coincide with each other.

By providing the excessive rotation preventing mechanism of the ball ramp mechanism as in the invention, the ball can firmly be restricted from riding over by excessive rotation of the screw shaft member and therefore, when the plurality of ramp faces are constituted in a shape of the same circle, the operational rotating angle of the ball can be set to the point of overlapping the respective ramp grooves and the operational effective diameter can be reduced. Therefore, the downsizing of the ball ramp mechanism can be realized (see FIG. 3).

Further, according to the invention, all of the following contents can be carried out by a single one of the coil spring 23 and many functions can be achieved by one part and a number of parts can considerably be reduced.

<I> The piston head 4 and the ramp plate 10 can elastically be coupled (the piston head 4 is permitted to be movable relative to the ramp plate 10).

<II> The load can be applied to the ramp plate 10 and the ball 11 and the screw shaft member 9 and the respective members can be prevented from fluctuating by vibration.

<III> Recovery torque can be provided to the ball 11 (the initial position of the ball 11 can be determined and a ramp operating axial force can be determined).

<IV> When the end plate 22 and the piston case 6 are locked by each other, the end plate 22 can be locked by utilizing rotational torque of the coil spring 23 relative to the piston case 6.

As described in details, according to the present invention, there is provided the ball ramp excessive rotation preventing mechanism in which one member of the ramp plate and the disc member is provided with the first projected portion, other thereof is provided with the second projected portion capable of butting each other and therefore, even when the electric motor is going to rotate these members by a predetermined angle or more, rotation is restricted mechanically and therefore, the ball can be prevented from riding over the ball groove. Further, the effective diameter of the ramp can be reduced and the predetermined rotational angle can be increased and the compact formation of the ball ramp mechanism can be achieved. Further, the piston head is not detached from the ball ramp mechanism by constituting the shape of the piston head substantially in the cylindrical shape, bending the front end outwardly to form in the flange shape constitute the projected member, further, bending the front end of the piston case in the cylindrical shape inwardly to constitute the engaging member, engaging the projected member and the engaging member, further, arranging the coil spring between the disc member of the screw shaft member and the end plate and integrally assembling the piston head and the ball ramp mechanism by the piston case, the coil spring and the end plate to unitize. Further, the respective members can be prevented from fluctuating by vibration by elastically coupling the piston head and the ramp plate by the single coil spring, and applying load in the axial direction to the ramp plate, and the ball and the screw shaft member.

Further, there can be achieved excellent effects of capable of providing the recovery torque to the ball by the coil spring (deciding the initial position of the ball 11 and determining the ramp operating axial force), and easily capable of locking the end plate to the piston case (capable of locking the end plate by the piston case by utilizing rotation torque of the coil spring), further, capable of reducing the number of parts since many functions are achieved by the single part and so on.

What is claimed is:

1. An electric disc brake comprising a piston for pressing a pad to a rotor via a ball ramp mechanism by driving an electric motor, wherein the ball ramp mechanism includes:

a spherical member;

two squeezing members, rotatable relatively, each having a circular-arc-shaped groove with a gradually changed depth, squeezing the spherical member in the circular-arc-shaped grooves, an excess rotation preventing mechanism for restricting excess rotation between the squeezing members to a predetermined range of rotation angle, wherein the excess rotation preventing mechanism comprises a first projected portion formed at one of the squeezing members and a second projected portion at other member thereof, and the first projected portion and the second projected portion are able to butt each other, and wherein the first projected portion is formed at a central opening of the one member, and the second projected portion is inserted into a central opening of the other member.

2. An electric disc brake comprising a piston for pressing a pad to a rotor via a ball ramp mechanism by driving an electric motor, wherein the ball ramp mechanism includes:

a spherical member;

two squeezing members, rotatable relatively, each having a circular-arc-shaped groove with a gradually changed depth, squeezing the spherical member in the circular-arc-shaped grooves, an excess rotation preventing mechanism for restricting excess rotation between the squeezing members to a predetermined range of rotation angle, wherein the piston comprises a piston head and a cylindrical member, and the piston head is prevented from being detached from the ball ramp mechanism by a detachment preventing mechanism, and the piston head is inclinable to the ball ramp mechanism.

3. The electric disc brake according to claim 2, wherein the cylindrical member is arranged slidably in an axial direction of a rotor in a cylinder formed at a caliper of the electric disc brake, the piston head is engaged with the cylindrical member restricted to move to a side of the rotor, and the detachment preventing mechanism is constituted of an integral assembly comprising the piston head, the ball ramp mechanism, a coil spring and a plate assembled into the cylindrical member in an order.

* * * * *